United States Patent
Cho et al.

(10) Patent No.: US 7,782,422 B2
(45) Date of Patent: Aug. 24, 2010

(54) LIQUID CRYSTAL DISPLAY DEVICE UTILIZING FLUORESCENT MEMBERS ILLUMINATED BY BLUE LIGHT TO PRODUCE RED, GREEN, BLUE AND WHITE PIXEL REGIONS

(75) Inventors: Don-Chan Cho, Seongnam-si (KR); Seok-Hyun Nam, Seoul (KR); Hyun-Jin Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 152 days.

(21) Appl. No.: 11/254,288

(22) Filed: Oct. 19, 2005

(65) Prior Publication Data

US 2006/0146229 A1 Jul. 6, 2006

(30) Foreign Application Priority Data

Jan. 6, 2005 (KR) .............. 10-2005-0001188

(51) Int. Cl.
*G02F 1/1335* (2006.01)

(52) U.S. Cl. .................. 349/71; 349/69; 349/70

(58) Field of Classification Search .......... 349/70, 349/106–111, 61, 71
See application file for complete search history.

(56) References Cited

U.S. PATENT DOCUMENTS 5,678,917 A * 10/1997 Bergkvist ............... 362/84
6,100,861 A * 8/2000 Cohen et al. ............ 345/88
6,365,916 B1 * 4/2002 Zhong et al. ........... 257/59
6,587,168 B2 * 7/2003 Jones et al. ............. 349/96
6,853,416 B2 * 2/2005 Hamamoto et al. ...... 349/106
6,873,382 B2 * 3/2005 Chang et al. ............ 349/106
6,888,604 B2 * 5/2005 Rho et al. .............. 349/146
7,250,722 B2 * 7/2007 Cok et al. .............. 313/506
7,256,855 B2 * 8/2007 Baek .................... 349/144
2003/0142246 A1 * 7/2003 Kato ..................... 349/65

FOREIGN PATENT DOCUMENTS

| JP | 2002040408 A | * 2/2002 |
| JP | 2003-005182 | 1/2003 |
| KR | 10-2001-0007958 A | 2/2001 |

\* cited by examiner

*Primary Examiner*—David Nelms
*Assistant Examiner*—Jessica M Merlin
(74) *Attorney, Agent, or Firm*—Innovation Counsel LLP

(57) ABSTRACT

In a display panel and a display device having the display panel, the display device has a first pixel area, a second pixel area, a third pixel area and a fourth pixel area. A red fluorescent member, a green fluorescent member and a yellow fluorescent member are formed in the first pixel area, the second pixel area and the third pixel area. The red fluorescent member emits a red light by using a blue light incident thereon. The green fluorescent member emits a green light by using a blue light incident thereon. The yellow fluorescent member emits a white light by using a blue light incident thereon. A blue light incident on the fourth pixel area passes through the fourth pixel area so that the blue light is irradiated from the fourth pixel area.

9 Claims, 8 Drawing Sheets

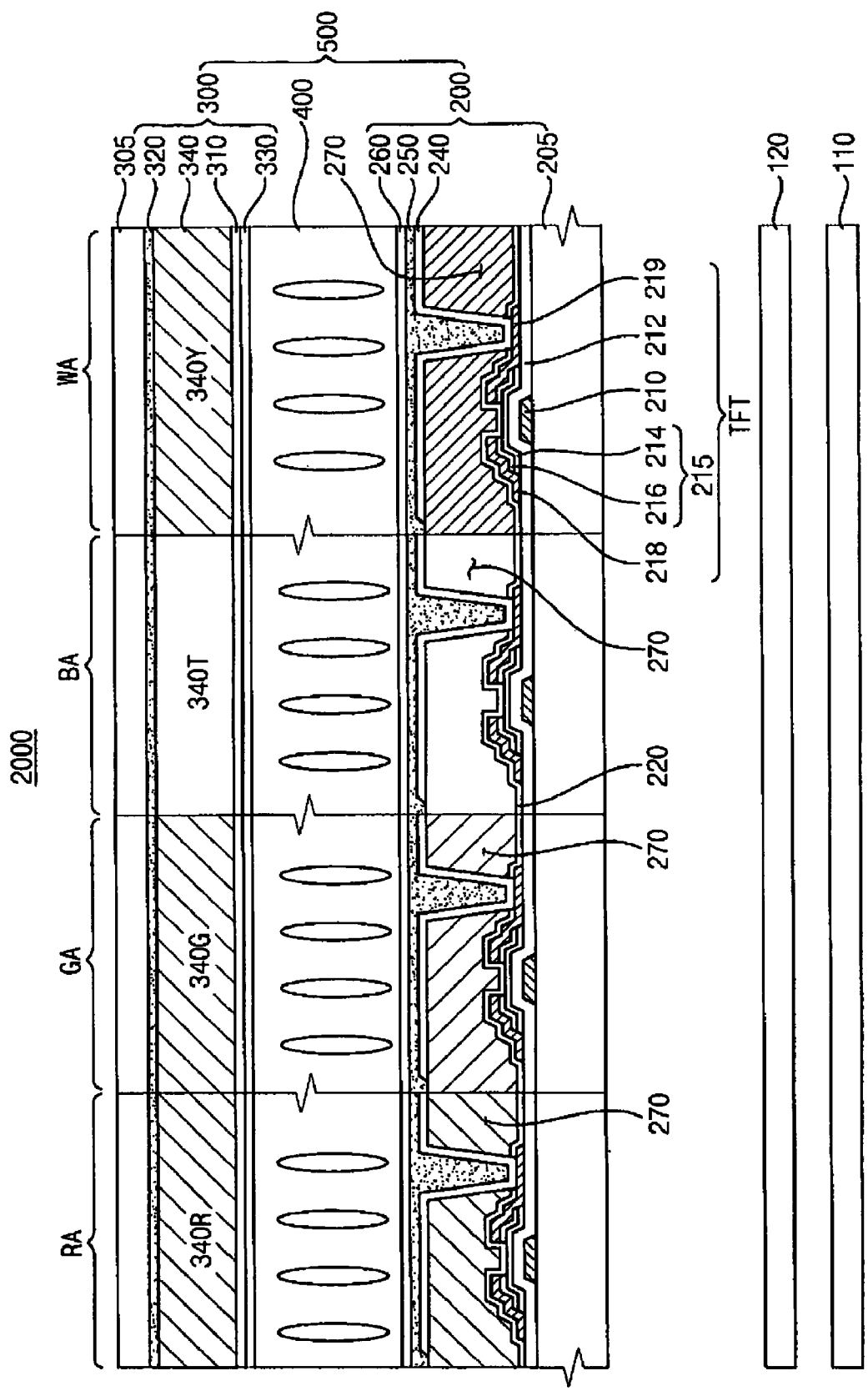

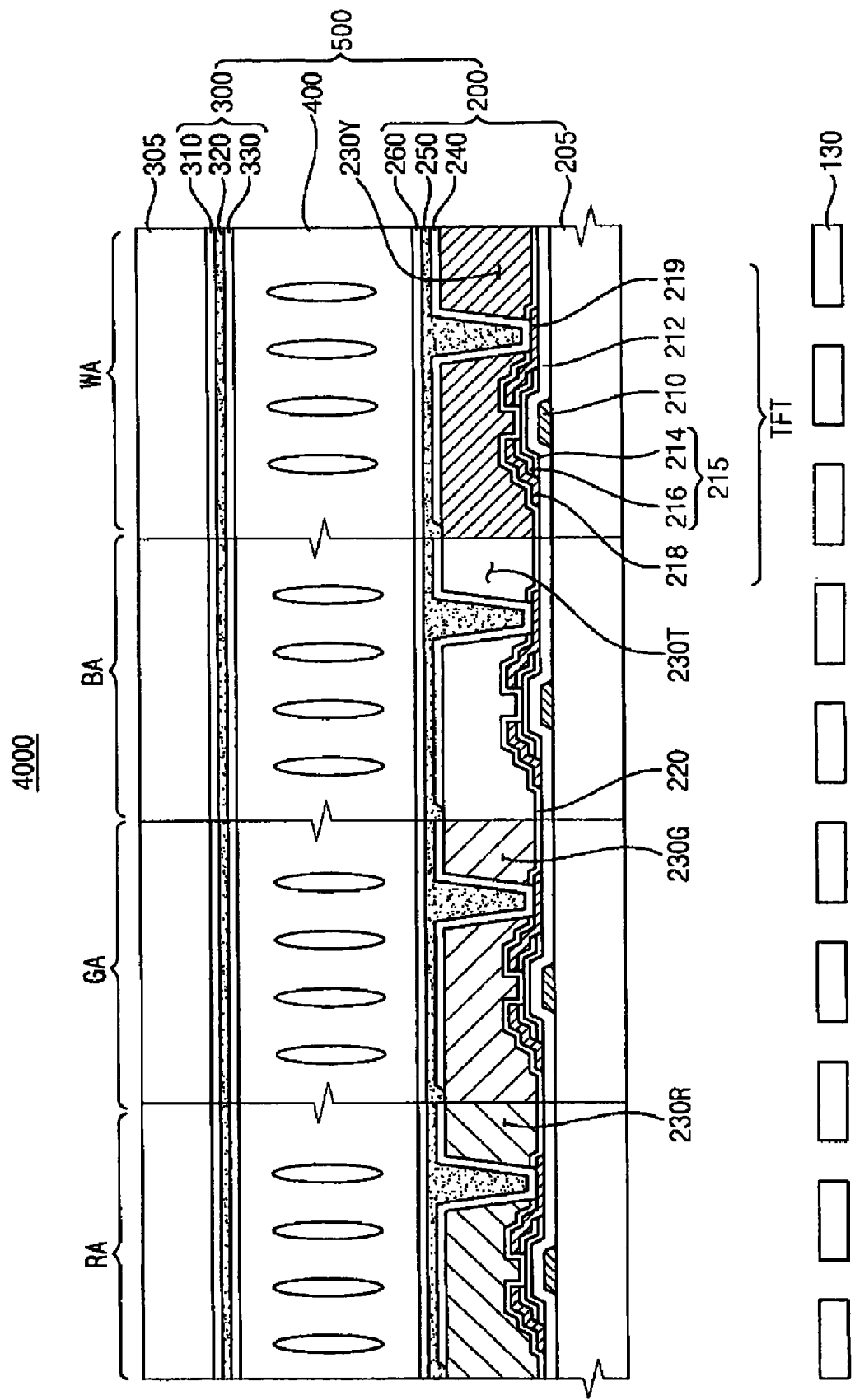

LIQUID CRYSTAL DISPLAY DEVICE UTILIZING FLUORESCENT MEMBERS ILLUMINATED BY BLUE LIGHT TO PRODUCE RED, GREEN, BLUE AND WHITE PIXEL REGIONS

CROSS REFERENCE TO RELATED APPLICATION

This application claims priority under 35 USC §119 to Korean Patent Application No. 2005-1188 filed on Jan. 6, 2005, the disclosure of which is herein incorporated by reference in its entirety.

BACKGROUND OF THE INVENTION

1. Field of the Invention

The present invention relates to a display panel and a display device including the display panel. More particularly, the present invention relates to a display device including color fluorescent members for displaying various colors and a display device having the display panel.

2. Description of the Related Art

In general, a liquid crystal display (LCD) device includes a first substrate, a second substrate and a liquid crystal layer. The liquid crystal layer has an anisotropically dielectric characteristic. The liquid crystal layer is positioned between the first substrate and the second substrate.

In order to operate the liquid crystal display device, an electric field is applied to the liquid crystal layer. The light transmissivity of the liquid crystal layer may vary in accordance with the strength of the electric field. The strength of the electric field is closely controlled for enabling the liquid crystal display device to display a desired image.

In detail, the electric field applied to the liquid crystal layer may rearrange the liquid crystal molecules in the liquid crystal layer. Thus, the transmissivity of the liquid crystal layer varies depending on the applied electric field.

A backlight assembly supplies white light to the liquid crystal layer. The liquid crystal layer modulates the brightness of the white light and provides a color filter for the white light. Because the white light passes through the color filter, the image displayed by the liquid crystal display device has various colors.

Thus, to display color images, it is currently necessary for the liquid crystal display device to have the color filter. However, this color filter requirement can be a problem in that the cost of manufacturing the color filter is relatively high.

SUMMARY OF THE INVENTION

Exemplary embodiments of the present invention provide a display panel having color fluorescent patterns instead of a conventional color filter. Exemplary embodiments of the present invention provide a display device having the display panel.

In accordance with one aspect of the present invention, a display panel includes a substrate, a red fluorescent member, a green fluorescent member and a yellow fluorescent member. The substrate has a first pixel area, a second pixel area, a third pixel area and a fourth pixel area. The red fluorescent member is formed in the first pixel area. The red fluorescent member emits a red light by using a blue light incident thereon. The green fluorescent member is formed in the second pixel area. The green fluorescent member emits a green light by using a blue light incident thereon. The yellow fluorescent member is formed in the third pixel area. The yellow fluorescent member emits a white light by using a blue light incident thereon. A blue light incident on the fourth pixel area passes through the fourth pixel area so that the blue light is irradiated from the fourth pixel area.

In accordance with another aspect of the present invention, a display device includes a substrate, a switching member, a color change portion and a pixel portion. The substrate has a first pixel area, a second pixel area, a third pixel area and a fourth pixel area. The switching member is formed in each of the first pixel area, the second pixel area, the third pixel area and the fourth pixel area. The color change portion covers the first pixel area, the second pixel area, the third pixel area and the fourth pixel area. The color change portion partially exposes portions of switching members. The switching member is formed in each of the first pixel area, the second pixel area, the third pixel area and the fourth pixel area. The pixel portion is electrically connected to the portions of the switching members.

In accordance with yet another aspect of the present invention, a display device includes a light source and a display panel. The light source generates a blue light. The display panel includes a first pixel area, a second pixel area, a third pixel area and a fourth pixel area. The first pixel area has a red fluorescent member emitting a red light by using the blue light incident thereon. The second pixel area has a green fluorescent member emitting a green light by using the blue light incident thereon. The third pixel area has a yellow fluorescent member emitting a white light by using the blue light incident thereon. The blue light incident on the fourth pixel area passes through the fourth pixel area so that the blue light is irradiated from the fourth pixel area.

According to the present invention, a liquid crystal display panel including a red fluorescent member, a green fluorescent member, a yellow fluorescent member and a transparent pattern may display a desired image by using a blue light incident on the red fluorescent member, the green fluorescent member, the yellow fluorescent member and the transparent pattern.

BRIEF DESCRIPTION OF THE DRAWINGS

The above and other advantages of the present invention will become readily apparent by reference to the following detailed description when considered in conjunction with the accompanying drawings in which:

FIG. 4 is a cross-sectional view illustrating a liquid crystal display device in accordance with an exemplary embodiment of the present invention;

FIG. 7 is a cross-sectional view illustrating a liquid crystal display device in accordance with an exemplary embodiment of the present invention.

DESCRIPTION OF THE EMBODIMENTS

Figure 1:
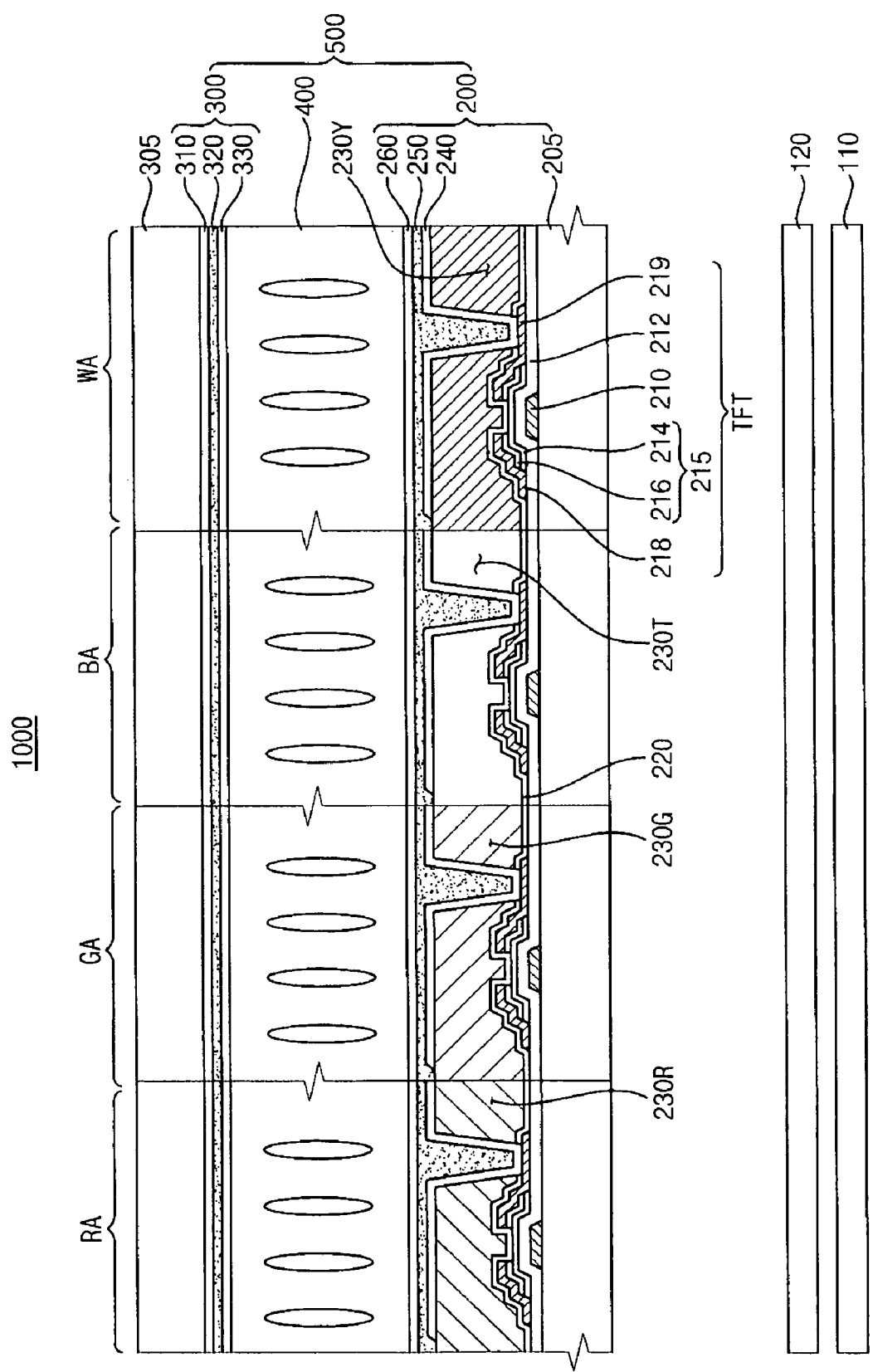
FIG. 1 is a cross-sectional view illustrating a liquid crystal display device in accordance with an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. It will be understood that when an element or layer is referred to as being "on" or "connected to" another element or layer, it can be directly on or directly connected to the other element or layer or intervening elements or layers may be present.

Like reference numerals refer to like elements throughout.

It will be understood that, although the terms first, second, etc. may be used herein to describe various elements, components or layers, these elements, components or layers should not be limited by these terms. These terms are only used to distinguish one element, component or layer from another element, component or layer. Thus, a first element, component or layer discussed below could be termed a second element, component or layer without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, elements or components, but do not preclude the presence or addition of one or more other features, elements or components.

Unless otherwise defined, all terms (including technical and scientific terms) used herein have the same meaning as what is commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Various embodiments of the present invention will now be described with reference to the accompanying drawings.

FIG. 1 is a cross-sectional view illustrating a liquid crystal display device in accordance with an exemplary embodiment of the present invention.

Referring to FIG. 1, a liquid crystal display device 1000 includes a lamp unit 110, a light guide panel 120, an array substrate 200, a cover substrate 300 and a liquid crystal layer 400.

A liquid crystal display panel 500 includes the array substrate 200, the cover substrate 300 and the liquid crystal layer 400.

The lamp unit 110 generates a blue light in the visible light zone of the electromagnetic spectrum. As known, blue light has a substantially short wavelength relative to visible light of other colors.

The blue light irradiated from the lamp unit 110 is incident on the light guide panel 120. When the blue light incident on the light guide panel 120 passes through the light guide panel 120, the light guide panel 120 guides the blue light. Thus, the blue light is irradiated from the light guide panel 120 toward the array substrate 200.

The array substrate 200 includes a first substrate 205, a gate electrode 210, a gate insulation layer 212 and an active layer 215. The gate electrode 210 is formed on the first substrate 205. The gate insulation layer 212 covers the gate electrode 210 and may include silicon nitride (SixNy). The active layer 215 partially covers the portion of the gate insulation layer 212 that is positioned above the gate electrode 210. The active layer 215 includes an amorphous silicon layer 214 and an N+ amorphous silicon layer 216. The N+ amorphous silicon layer 216 is formed on the amorphous silicon layer 214.

In addition, the array substrate 200 includes a source electrode 218 and a drain electrode 219. The source electrode 218 partially covers the active layer 215. The drain electrode 219 is spaced apart from the source electrode 218.

A thin film transistor (TFT) includes the gate electrode 210, the amorphous silicon layer 214, the N+ amorphous silicon layer 216, the source electrode 218 and the drain electrode 219.

The gate electrode 210, the source electrode 218 or the drain electrode 219 may be a single-layered structure or a double-layered structure. If the gate electrode 210, the source electrode 218 or the drain electrode 219 is the single-layered structure, the gate electrode 210, the source electrode 218 or the drain electrode 219 may include aluminum (Al) or neodymium (Nd), either alone or as a mixture. If the gate electrode 210, the source electrode 218 or the drain electrode 219 is a double-layered structure, the gate electrode 210, the source electrode 218 or the drain electrode 219 may include a lower layer and an upper layer. The lower layer may include a first material having a substantially high physical and chemical characteristics, such as chromium (Cr) or molybdenum (Mo). These elements may be used alone or mixed. The upper layer may include a second material having a substantially low resistivity, such as aluminum (Al).

The array substrate 200 includes a passivation layer 220 that partially covers the TFT. The passivation layer 220 may partially expose the drain electrode 219.

Furthermore, the array substrate 200 includes a red fluorescent member 230R, a green fluorescent member 230G, a transparent pattern 230T and a yellow fluorescent member 230Y. The red fluorescent member 230R, the green fluorescent member 230G, the transparent pattern 230T and the yellow fluorescent member 230Y are formed in pixel areas. That is, the red fluorescent member 230R, the green fluorescent member 230G, the transparent pattern 230T and the yellow fluorescent member 230Y are formed in a first pixel area RA, a second pixel area GA, a third pixel area BA and a fourth pixel area WA, respectively.

If the blue light passes through the red fluorescent member 230R, the green fluorescent member 230G, or the yellow fluorescent member 230Y, the blue color of the light changes. In detail, if the blue light is incident on the red fluorescent member 230R, red light emerges from the red fluorescent member 230R. If the blue light is incident on the green fluorescent member 230G, green light emerges from the green fluorescent member 230G. If the blue light is incident on the yellow fluorescent member 230Y, white light emerges from the yellow fluorescent member 230Y. If the blue light is incident on the transparent pattern 230T, the blue light passes through transparent pattern 230T substantially unaltered. In this case, blue light emerges from the transparent pattern 230T.

Each of the pixel areas has a TFT. The array substrate 200 includes pixel electrodes 240, a first polarizing layer 250, and a first alignment layer 260. The pixel electrodes 240 are electrically connected to the drain electrodes 219 of the TFTs. The first polarizing layer 250 covers the pixel electrode 240. The first alignment layer 260 covers the first polarizing layer 250.

The pixel electrode 240 is transparent. The pixel electrode 240 may include one or more of indium tin oxide (ITO), tin oxide (TO) or indium zinc oxide (IZO).

Although it is not explicitly shown in the drawings, the liquid crystal display device 1000 includes a capacitor wire (not shown) electrically insulated from the TFT. The capacitor wire overlaps the pixel electrode 240 so that the portion where the capacitor wire overlaps the pixel electrode 240 may operate as a storage capacitor (Cst).

A thin crystal film (TCF™) produced by Optiva, Inc. of USA is used as the first polarizing layer 250. The TCF™ is an anisotropic polarizing layer including a dyestuff formed by using a chromogen base.

Table 1 shows characteristics of the TCF™.

TABLE 1

| Optical characteristics | | | | | |
|---|---|---|---|---|---|
| Transparency (%) | H90 (%) | H0 (%) | Efficiency (%) | C/R (%) | Thickness of the TCF |
| 44.95 | 5.26 | 35.15 | 86.00 | 6.68 | 0.3E □ |
| 44.53 | 5.08 | 34.57 | 86.25 | 6.81 | 0.3E □ |
| 34.22 | 0.11 | 23.31 | 99.54 | 215.46 | 0.6E □ |
| 33.65 | 0.10 | 22.54 | 99.55 | 219.46 | 0.6E □ |
| 43.89 | 4.93 | 33.59 | 86.25 | 6.81 | 0.3E □ |
| 43.73 | 4.55 | 33.70 | 87.29 | 7.40 | 0.3E □ |
| 34.20 | 0.12 | 23.23 | 99.50 | 201.30 | 0.6E □ |
| 33.72 | 0.18 | 33.56 | 99.20 | 124.01 | 0.4E □ |

In Table 1, "H0" indicates parallel transparency. Parallel transparency is measured when a first polarizing axis of the first polarizing layer 250 formed on the array substrate 200 is substantially parallel to a second polarizing axis of a second polarizing layer 320 over the cover substrate 400.

"H90" indicates perpendicular transparency. Perpendicular transparency is measured when the first polarizing axis of the first polarizing layer 250 formed on the array substrate 200 is substantially perpendicular to the second polarizing axis of the second polarizing layer 320 formed over the cover substrate 400.

As shown in Table 1, the transparency, the parallel transparency (H0), the perpendicular transparency (H90) and a contrast ratio (C/R) vary with the thickness of the TCF. More specifically, the transparency, the parallel transparency (H0) and the perpendicular transparency (H90) decrease as the thickness of the TCF increases. In contrast, the contrast ratio (C/R) increases as the TCF thickness increases.

On the other hand, if the thickness of the TCF decreases, the transparency, the parallel transparency (H0) and the perpendicular transparency (H90) increase. However, the contrast ratio (C/R) decreases.

A polymer resin in liquid gel state may be used form the TCF. The polymer resin has physical characteristics substantially identical to those of a photoresist. For example, the polymer resin has a viscosity of about 300 psi. Thus, the TCF may be formed by a slot die coating method.

The cover substrate 300 includes a common electrode 310, the second polarizing layer 320 and a second alignment layer 330. The common electrode 310 is formed underneath a transparent substrate 305. The common electrode 310 is deposited above the pixel areas. The second polarizing layer 320 is formed underneath the common electrode 310 so that the common electrode is covered with the second polarizing layer 320. The second alignment layer 330 is formed underneath the second polarizing layer 320 so that the second polarizing layer 320 is covered with the second alignment layer 330. The cover substrate 300 is combined with the array substrate 200 so that the liquid crystal layer 400 is received between the cover substrate 300 and the array substrate 200.

The thin crystal film (TCF™) produced by Optiva, Inc. of USA is used as the second polarizing layer 320. The TCF™ is the anisotropic polarizing layer including the dyestuff formed by using the chromogen base.

The second polarizing axis of the second polarizing layer 320 may be substantially perpendicular to the first polarizing axis of the first polarizing layer 250.

As illustrated in FIG. 1, liquid crystal molecules in the liquid crystal layer 400 are vertically arranged. In other words, the liquid crystal molecules are in a vertical alignment (VA) mode. However, many apparent variations of the liquid crystal molecule alignment are possible. For example, the liquid crystal molecules may be in a twisted nematic (TN) mode or in a super twisted nematic (STN) mode.

As illustrated in FIG. 1, the lamp unit 110 has a bar shape. However, many variations are possible for the shape of the lamp unit 110. For example, the lamp unit 110 may have a U shape or an S shape.

In some embodiments, the liquid crystal display device 1000 has a point light source such as a fluorescent diode instead of the lamp unit 110.

Hereinafter, the operation of the liquid crystal display device 1000 will be described.

The liquid crystal layer 400 has a normally black mode. In the normally black mode, the color of the liquid crystal layer 400 is black if no power is applied to the liquid crystal layer 400. The first polarizing layer 250 has the first polarizing axis. The second polarizing layer 320 has the second polarizing axis. The first polarizing axis may be perpendicular to the second polarizing axis.

Figure 2:
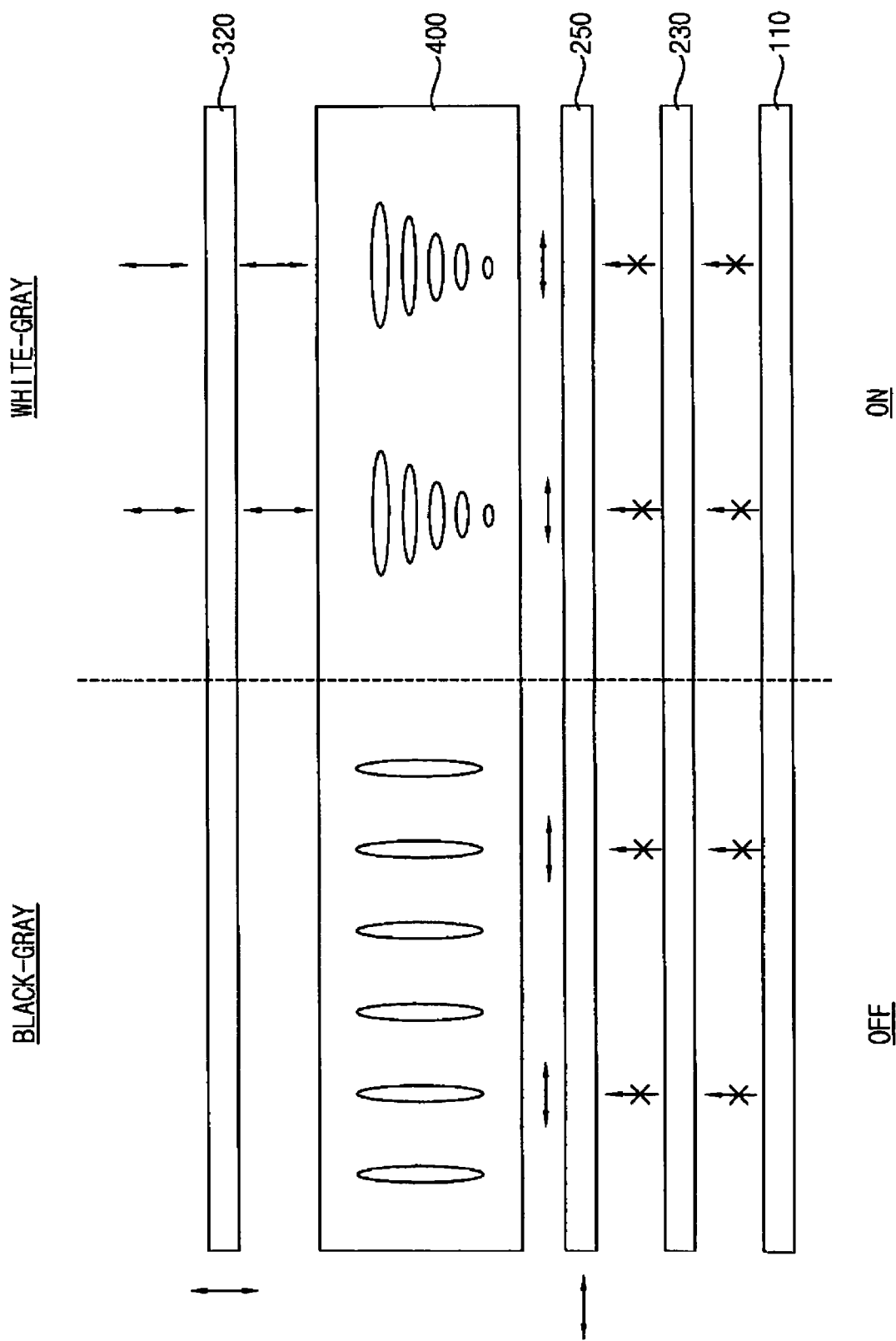
FIG. 2 is a conceptual view illustrating a light path in the liquid crystal display device illustrated in FIG. 1.

FIG. 2 is a cross-sectional view illustrating the light path in the liquid crystal display device of FIG. 1.

Referring to FIGS. 1 and 2, the lamp unit 110 generates the blue light. The blue light may not be polarized. If the blue light passes through the red fluorescent member 230R, the green fluorescent member 230G, and the yellow fluorescent member 230Y, red light, green light, and yellow light emerge from the red fluorescent member 230R, the green fluorescent member 230G and the yellow fluorescent member 230Y, respectively. If the blue light is incident on the transparent pattern 230T, the blue light passes through transparent pattern 230T substantially unaltered. In this case, the blue light emerges from the transparent pattern 230T.

The red light, the green light or the white light may not be polarized.

The blue light includes a first blue ray and a second blue ray of different polarizations. The first blue ray may pass through the first polarizing layer 250 having the first polarizing axis. However, the first blue ray may not pass through the second polarizing layer 320. On the other hand, the second blue ray may not pass through the first polarizing layer 250 having the first polarizing axis. However, the second blue ray may pass through the second polarizing layer 320 having the second polarizing axis.

The red light includes a first red ray and a second red ray of different polarizations. The first red ray may pass through the first polarizing layer 250 having the first polarizing axis. However, the first red ray may not pass through the second polarizing layer 320. On the other hand, the second red ray may not pass through the first polarizing layer 250 having the first polarizing axis. However, the second red ray may pass through the second polarizing layer 320 having the second polarizing axis.

The green light includes a first green ray and a second green ray of different polarizations. The first green ray may pass through the first polarizing layer 250 having the first polarizing axis. However, the first green ray may not pass through the second polarizing layer 320 having the second polarizing axis. On the other hand, the second green ray may not pass through the first polarizing layer 250 having the first polarizing axis. However, the second green ray may pass through the second polarizing layer 320 having the second polarizing axis.

The white light includes a first white ray and a second white ray of different polarizations. The first white ray may pass through the first polarizing layer 250 having the first polarizing axis. However, the first white ray may not pass through the second polarizing layer 320 having the second polarizing axis. On the other hand, the second white ray may not pass through the first polarizing layer 250 having the first polarizing axis. However, the second white ray may pass through the second polarizing layer 320 having the second polarizing axis.

The first polarizing layer 250 provides the liquid crystal layer 400 with the first blue ray, the first red ray, the first green ray and the first white ray. That is, the second blue ray, the second red ray, the second green ray and the second white ray are blocked by the first polarizing layer 250.

The liquid crystal layer 400 may block the first blue ray, the first red ray, the first green ray and the first white ray or may delay the wavelengths of the first blue ray, the first red ray, the first green ray and the first white ray by ./2.

In detail, if an electric potential difference is not applied to the liquid crystal layer 400, the first blue ray, the first red ray, the first green ray and the first white ray are blocked by the liquid crystal layer 400. In this case, the first blue ray, the first red ray, the first green ray and the first white ray will not be incident on the second polarizing layer 320. Because the first blue ray, the first red ray, the first green ray and the first white ray are not incident on the second polarizing layer 320, the liquid crystal display device 1000 may display an image having a substantially black gradation (BLACK-GRAY).

If the electric potential difference is applied to the liquid crystal layer 400, the liquid crystal layer 400 delays the wavelengths of the first blue ray, the first red ray, the first green ray and the first white ray by ./2.

If the wavelengths of the first blue ray, the first red ray, the first green ray and the first white ray are delayed by ./2, the first blue ray, the first red ray, the first green ray and the first white ray may be converted into the second blue ray, the second red ray, the second green ray and the second white ray, respectively.

Thus, the second blue ray, the second red ray, the second green ray and the second white ray may be supplied from the liquid crystal layer 400 to the second polarizing layer 320.

The second blue ray, the second red ray, the second green ray and the second white ray then pass through the second polarizing layer 320.

As a result, the liquid crystal display device 1000 displays an image having a substantially white gradation (WHITE-GRAY).

A conventional color filter passes a conventional white light having a predetermined wavelength. Thus, the brightness of a conventional liquid crystal display device having the conventional color filter may be relatively low.

According to the present invention, the liquid crystal display device 1000 uses the blue light having a relatively short wavelength instead of the conventional white light. By using the light of a shorter wavelength, the brightness of the liquid crystal display device is increased. In addition, a display quality of the liquid crystal display device 1000 may be relatively high.

Figure 3A:
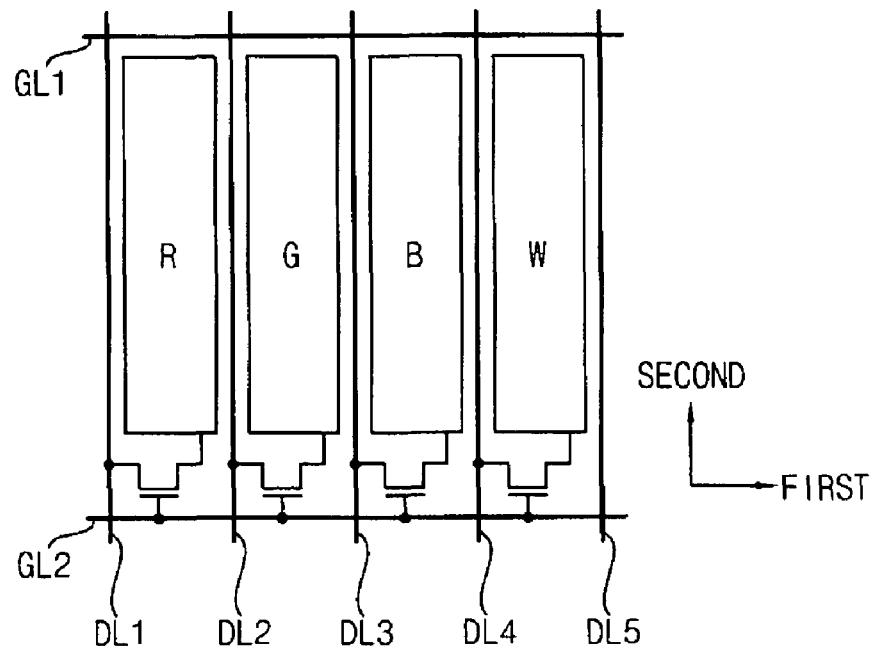
FIGS. 3A to 3C are plan views illustrating pixel areas in accordance with exemplary embodiments of the present invention.
Figure 3B:
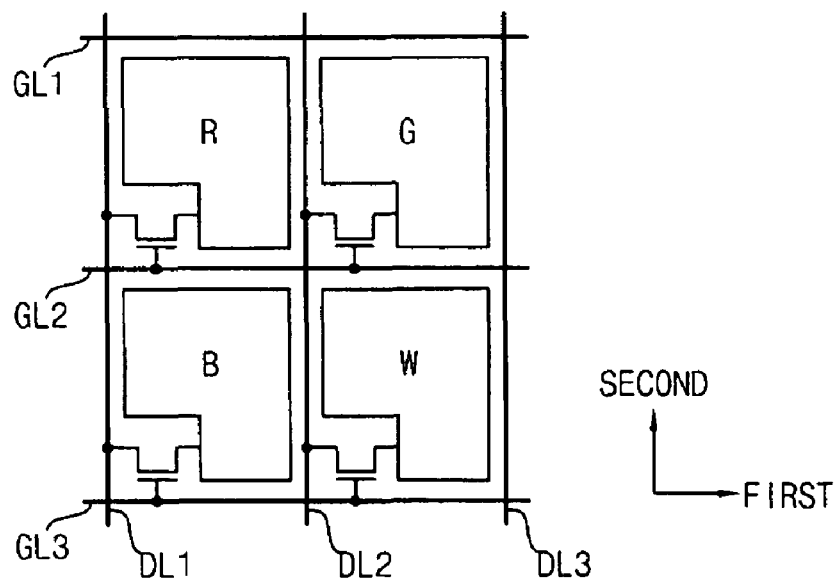
Figure 3C:
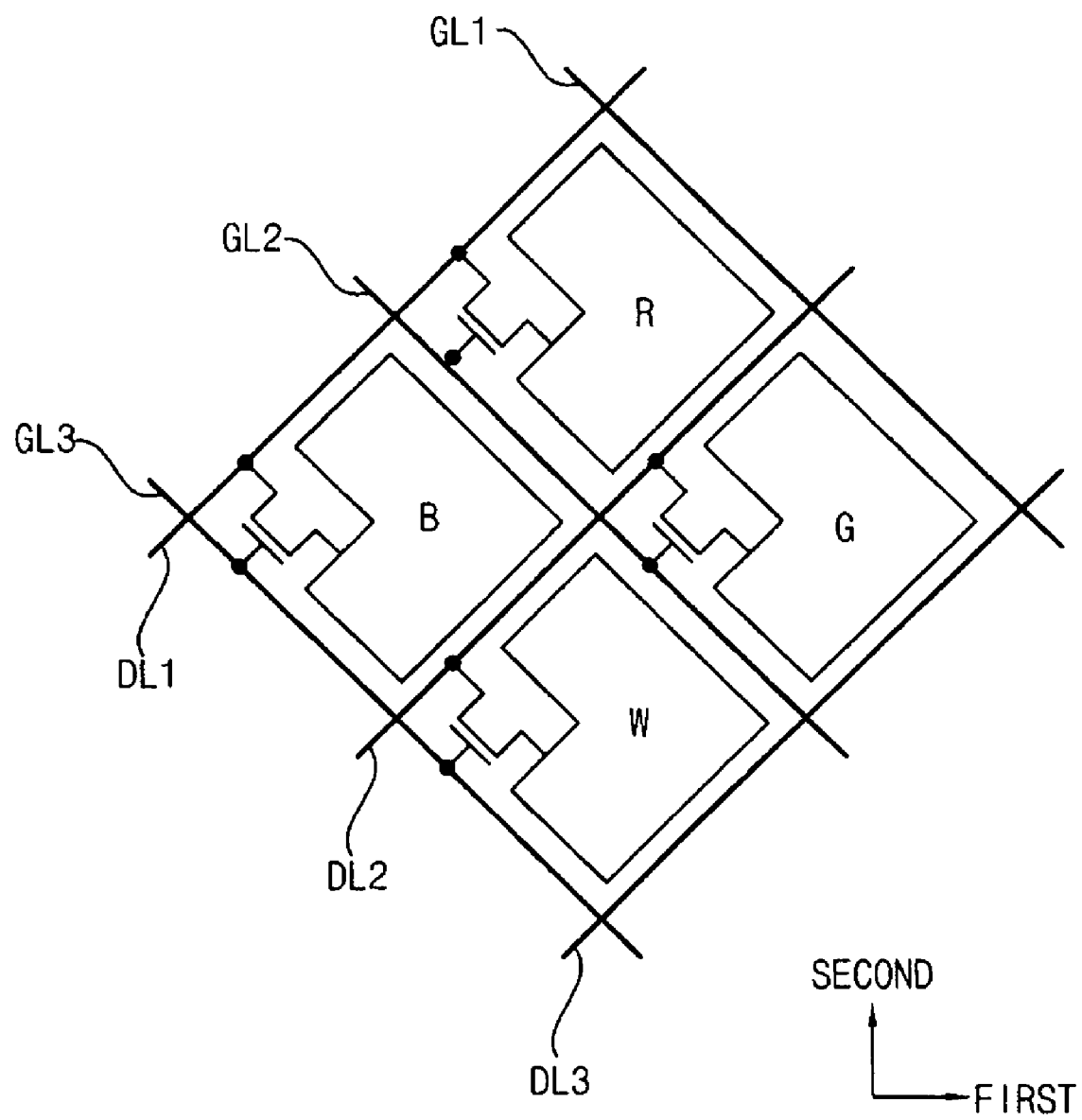

FIGS. 3A to 3C are plan views illustrating pixel areas in accordance with exemplary embodiments of the present invention. For convenience in explanation, a gate line, a data line, a switching device and a pixel electrode are shown in FIGS. 3A to 3C. The switching device is connected to the gate line and the data line. The pixel electrode is connected to the switching device.

Referring to FIG. 3A, a first gate line GL1 and a second gate line GL2 are lines that extend in a first direction. The first gate line GL1 and the second gate line GL2 are substantially parallel to each other.

A first data line DL1, a second data line DL2, a third data line DL3, a fourth data line DL4 and a fifth data line DL5 are lines that extend in a second direction. The first data line DL1, the second data line DL2, the third data line DL3, the fourth data line DL4 and the fifth data line DL5 are substantially parallel to each other.

The first gate line GL1, the second gate line GL2, the first data line DL1 and the second data line DL2 together define a first pixel area. The first gate line GL1, the second gate line GL2, the second data line DL2 and the third data line DL3 together define a second pixel area. The first gate line GL1, the second gate line GL2, the third data line DL3 and the fourth data line DL4 together define a third pixel area. The first gate line GL1, the second gate line GL2, the fourth data line DL4 and the fifth data line DL5 together define a fourth pixel area.

The first, second, third and fourth pixel areas may look like stripes of four colors that are arranged parallel to one another.

A red fluorescent member, a green fluorescent member and a yellow fluorescent member are formed in the first pixel area, the second pixel area and the fourth pixel area, respectively.

A transparent pattern may be formed in the third pixel area. Alternatively, there may be no pattern in the third pixel area.

A blue light B may be incident on rear portions of the first, second, third and fourth pixel areas.

If the blue light B passes through the red fluorescent member formed in the first pixel area, the blue light B may be converted to the red light R. In this case, the red light R emerges from a front portion of the red fluorescent member.

If the blue light passes through the green fluorescent member formed in the second pixel area, the blue light B may be converted to the green light G. In this case, the green light G emerges from a front portion of the green fluorescent member.

If the blue light B is incident on the rear portion of the third pixel area, the blue light B may pass through the third pixel area substantially unaltered and emerge from the third pixel area. No change in color occurs because the third pixel area either has a transparent pattern or no pattern. Therefore, the blue light B exits from a front portion of the third pixel area.

If the blue light B passes through the yellow fluorescent member formed in the fourth pixel area, the blue light B may be converted to white light W. In this case, the white light W emerges from a front portion of the yellow fluorescent member.

Referring to FIG. 3B, a first gate line GL1, a second gate line GL2 and a third gate line GL3 form lines that extend in a first direction. The first gate line GL1, the second gate line GL2 and the third gate line GL3 are substantially parallel to each other.

A first data line DL1, a second data line DL2 and a third data line DL3 form lines that extend in a second direction. The first data line DL1, the second data line DL2 and the third data line DL3 are substantially parallel to each other.

The first gate line GL1, the second gate line GL2, the first data line DL1 and the second data line DL2 together define a first pixel area. The first gate line GL1, the second gate line GL2, the second data line DL2 and the third data line DL3 together define a second pixel area. The second gate line GL2, the third gate line GL3, the first data line DL1 and the second data line DL2 together define a third pixel area. The second gate line GL2, the third gate line GL3, the second data line DL2 and the third data line DL3 together define a fourth pixel area.

The first, second, third and fourth pixel areas form a lattice of four colors.

A red fluorescent member, a green fluorescent member and a yellow fluorescent member are formed in the first pixel area, the second pixel area and the fourth pixel area, respectively. A transparent pattern may be formed in the third pixel area. Alternatively, there is no pattern in the third pixel area.

A blue light B may be incident on the rear portions of the first, second, third and fourth pixel areas.

If the blue light B passes through the red fluorescent member formed in the first pixel area, the blue light B may be converted to red light R. In this case, red light R emerges from a front portion of the red fluorescent member.

If the blue light passes through the green fluorescent member formed in the second pixel area, the blue light B may be converted to green light G. In this case, the green light G emerges from a front portion of the green fluorescent member.

If the blue light B is incident on the rear portion of the third pixel area, the blue light B passes through the third pixel area substantially unaltered and emerges from the third pixel area. There is no change in color because the third pixel area has either a transparent pattern or no pattern. Thus, the blue light B exits from a front portion of the third pixel area.

If the blue light B passes through the yellow fluorescent member formed in the fourth pixel area, the blue light B may be converted to white light W. Thus, the white light W emerges from a front portion of the yellow fluorescent member.

Referring to FIG. 3C, a first gate line GL1, a second gate line GL2 and a third gate line GL3 form lines that are substantially parallel to each other. The first gate line GL1, the second gate line GL2 and the third gate line GL3 form an angle of about 45 with respect to a first direction in a clockwise direction.

A first data line DL1, a second data line DL2 and a third data line DL3 also have line shapes. The first data line DL1, the second data line DL2 and the third data line DL3 are substantially parallel to each other. The first data line DL1, the second data line DL2 and the third data line DL3 form an angle of about 45 with respect to a second direction in the clockwise direction.

The first gate line GL1, the second gate line GL2, the first data line DL1 and the second data line DL2 together define a first pixel area. The first gate line GL1, the second gate line GL2, the second data line DL2 and the third data line DL3 together define a second pixel area. The second gate line GL2, the third gate line GL3, the first data line DL1 and the second data line DL2 together define a third pixel area. The second gate line GL2, the third gate line GL3, the second data line DL2 and the third data line DL3 together define a fourth pixel area.

Thus, the first, second, third and fourth pixel areas may form a lozenge shape having four colors.

A red fluorescent member, a green fluorescent member and a yellow fluorescent member are formed in the first pixel area, the second pixel area and the fourth pixel area, respectively. A transparent pattern may be formed in the third pixel area. Alternatively, there is no pattern in the third pixel area.

A blue light B may be incident on rear portions of the first, second, third and fourth pixel areas.

If the blue light B passes through the red fluorescent member formed in the first pixel area, the blue light B may be converted red light R. In this case, red light R emerges from a front portion of the red fluorescent member.

If the blue light passes through the green fluorescent member formed in the second pixel area, the blue light B may be converted to green light G. In this case, green light G may emerge from a front portion of the green fluorescent member.

If the blue light B is incident on the rear portion of the third pixel area, the blue light B passes through the third pixel area substantially unaltered and emerges from the third pixel area as blue light B. No color change occurs because the third pixel area has either a transparent pattern or no pattern. Thus, blue light B exits from a front portion of the third pixel area.

If the blue light B passes through the yellow fluorescent member formed in the fourth pixel area, the blue light B may be converted to white light W. In this case, white light W emerges from a front portion of the yellow fluorescent member.

In the embodiment of FIG. 3C, the gate lines or the data lines are straight lines. However, many apparent variations are possible for the shapes of the gate lines and the data lines. For example, the gate lines or the data lines may form non-straight lines (e.g., zigzag).

FIG. 4 is a cross-sectional view illustrating a liquid crystal display device in accordance with an exemplary embodiment of the present invention.

Referring to FIG. 4, a liquid crystal display device 2000 includes a lamp unit 110, a light guide panel 120, an array substrate 200, a cover substrate 300 and a liquid crystal layer 400.

In FIG. 4, the same reference numerals denote the same elements in FIG. 1. Thus, any further explanation of the same elements will be omitted.

The liquid crystal display panel 500 includes pixel areas. The pixel areas include a first pixel area RA, a second pixel area GA, a third pixel area BA and a fourth pixel area WA.

Each of the pixel areas includes parts of the array substrate 200, the cover substrate 300 and the liquid crystal layer 400. Each of the pixel areas has a TFT. The array substrate 200 includes pixel electrodes 240, a first polarizing layer 250 and a first alignment layer 260. The pixel electrodes 240 are electrically connected to drain electrodes 219 of the TFTs.

The first polarizing layer 250 covers the pixel electrode 240. The first alignment layer 260 covers the first polarizing layer 250.

The cover substrate 300 includes a second polarizing layer 320. The second polarizing layer 320 is formed underneath a transparent layer 305 so that the transparent layer 305 may be covered with the second polarizing layer 320. A thin crystal film (TCF™) produced by Optiva, Inc. of USA is used as the second polarizing layer 320. The TCF™ is an anisotropic polarizing layer including a dyestuff formed by using a chromogen base. The second polarizing layer 320 has a second polarizing axis. A first polarizing layer 250 has a first polarizing axis. The second polarizing axis may be substantially perpendicular to the first polarizing axis.

The cover substrate 300 includes a color change layer 340. The color change layer 340 is formed underneath the second polarizing layer 320 so that the color change layer 340 may cover the second polarizing layer 320.

The color change layer 340 includes a red fluorescent member 340R, a green fluorescent member 340G, a transparent pattern 340T and a yellow fluorescent member 340Y. The red fluorescent member 340R, the green fluorescent member 340G, the transparent pattern 340T and the yellow fluorescent member 340Y are formed in the first pixel area RA, the second pixel area GA, the third pixel area BA and the fourth pixel area WA, respectively.

If the blue light generated from the lamp unit 110 passes through the red fluorescent member 340R, the green fluorescent member 340G, or the yellow fluorescent member 340Y, the blue color of the light changes.

More specifically, if the blue light is incident on the red fluorescent member 340R, red light emerges from the red fluorescent member 340R. If the blue light is incident on the green fluorescent member 340G, green light emerges from the green fluorescent member 340G. If the blue light is incident on the yellow fluorescent member 340Y, white light emerges from the yellow fluorescent member 340Y. If the blue light is incident on the transparent pattern 340T, the blue light may pass through the transparent pattern 340T substantially unaltered and emerge as blue light from the transparent pattern 340T.

The cover substrate 300 includes a common electrode 310 and a second alignment layer 330. The common electrode 310 is formed beneath the color change layer 340 so that the common electrode 310 may cover the color change layer 340.

The cover substrate 300 is combined with the array substrate 200 so that the liquid crystal layer 400 may be received between the cover substrate 300 and the array substrate 200.

As illustrated in FIG. 4, liquid crystal molecules in the liquid crystal layer 400 are vertically arranged. In other words, the liquid crystal molecules are in a vertical alignment (VA) mode. However, many variations are possible for the alignment of the liquid crystal molecules. For example, the liquid crystal molecules may be in a twisted nematic (TN) mode or in a super twisted nematic (STN) mode.

As illustrated in FIG. 4, the first polarizing layer 250 covers the pixel electrode 240 therewith. The second polarizing layer 320 is positioned between the transparent substrate 305 and the color change layer 340. However, many variations are possible for the position of the second polarizing layer 320. For example, the first polarizing layer 250 may be positioned underneath the pixel electrode 240 or on the first alignment layer 260.

As illustrated in FIG. 4, the lamp unit 110 has a bar shape. However, many variations are possible for the shapes of the lamp unit 110. As one example, the lamp unit 110 has a U shape. As another example, the lamp unit 110 has an S shape.

In some embodiments, the liquid crystal display device 2000 has a point light source such as a fluorescent diode instead of the lamp unit 110.

Hereinafter, an operation of the liquid crystal display device 2000 will be described.

The liquid crystal layer 400 has a normally black mode. In the normally black mode, the color of the liquid crystal layer 400 is black if no power is applied to the liquid crystal layer 400. The first polarizing layer 250 has the first polarizing axis. The second polarizing layer 320 has the second polarizing axis. The first polarizing axis may be substantially perpendicular to the second polarizing axis.

Figure 5:
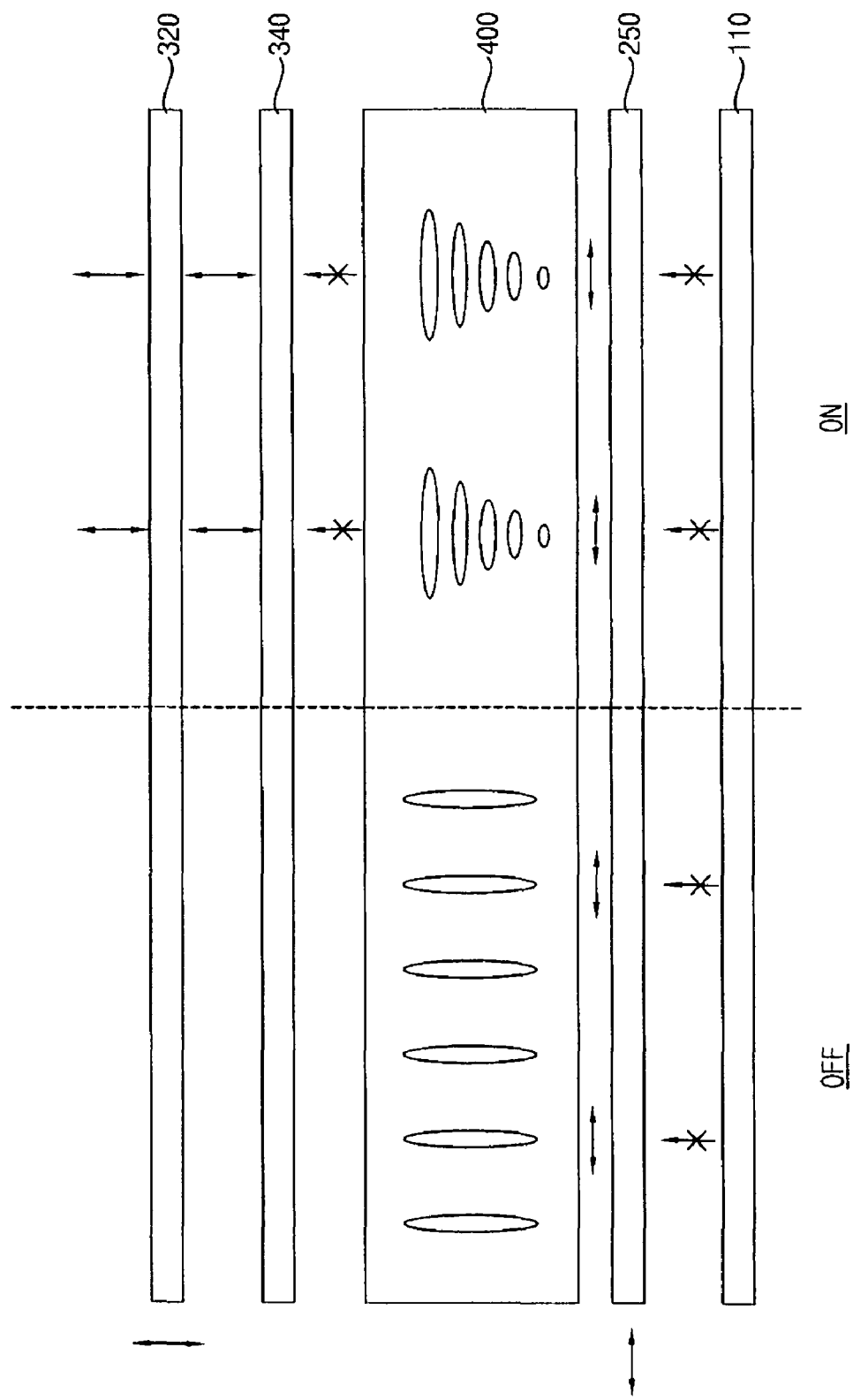
FIG. 5 is a conceptual view illustrating a light path in the liquid crystal display device illustrated in FIG. 4.

FIG. 5 is a conceptual view illustrating a light path in the liquid crystal display device illustrated in FIG. 1.

Referring to FIGS. 4 and 5, the lamp unit 110 generates blue light. The blue light may not be polarized.

The blue light includes a first blue ray and a second blue ray of different polarizations. The first blue ray may pass through the first polarizing layer 250 having the first polarizing axis. However, the first blue ray may not pass through the second polarizing layer 320. On the other hand, the second blue ray may not pass the first polarizing layer 250 having the first polarizing axis. However, the second blue ray may pass through the second polarizing layer 320 having the second polarizing axis.

The liquid crystal layer 400 may block the first blue ray or may delay the wavelength of the first blue ray by ./2.

In detail, if an electric potential difference is not applied to the liquid crystal layer 400, the liquid crystal layer 400 may block the first blue ray. In this case, the first blue ray will not be incident on the color change layer 340 as well as the second polarizing layer 320. Because the first blue ray is not incident on the color change layer 340 and the second polarizing layer 320, the liquid crystal display device 2000 may display an image having a substantially black gradation (BLACK-GRAY).

If the electric potential difference is applied to the liquid crystal layer 400, the liquid crystal layer 400 delays the wavelength of the first blue ray by ./2.

If the wavelength of the first blue ray is delayed by ./2, the first blue ray may be converted to the second blue ray capable of passing through the second polarizing layer 320. In this case, the second blue ray is supplied from the liquid crystal layer 400 to the color change layer 340.

In case that the second blue ray passes through the red fluorescent member 340R, the blue light may be changed into a second red ray capable of passing through the second polarizing layer 320.

If the second blue ray passes through the green fluorescent member 340G, the blue ray may be converted to a second green ray capable of passing through the second polarizing layer 320.

If the second blue ray is incident on the transparent pattern 340T, the blue light may pass through the transparent pattern 340T. In this case, the second blue ray emerges from the transparent pattern 340T.

If the second blue ray passes through the yellow fluorescent member 340Y, the blue ray may be converted to a second white ray capable of passing through the second polarizing layer 320.

Thus, the second red ray, the second green ray, the second blue ray and the second white ray incident on the second polarizing layer 320 may pass through the second polarizing layer 320. As a result, the liquid crystal display device 2000 may display an image having a substantially white gradation (WHITE-GRAY).

Figure 6:
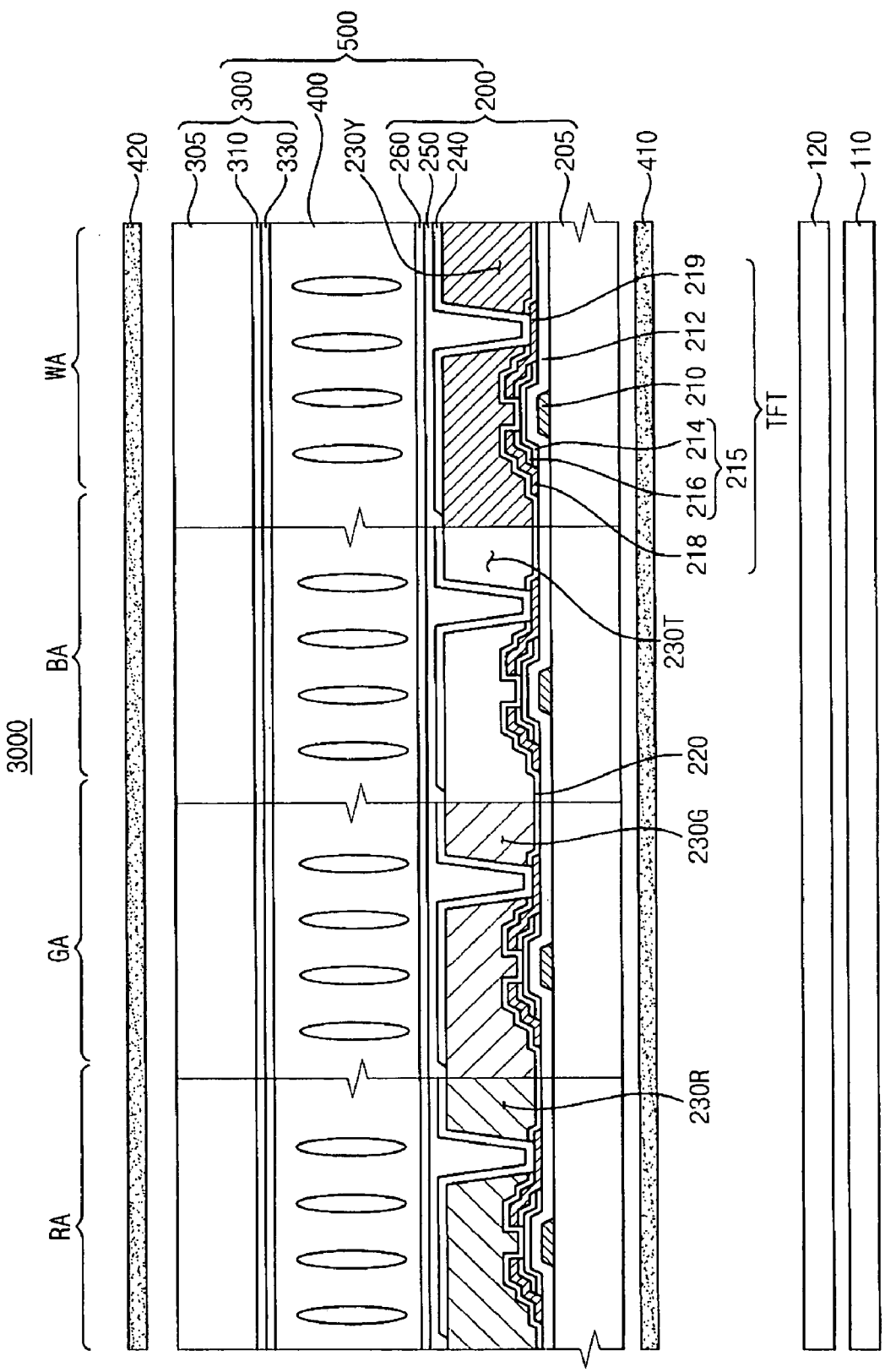
FIG. 6 is a cross-sectional view illustrating a liquid crystal display device in accordance with an exemplary embodiment of the present invention.

FIG. 6 is a cross-sectional view illustrating a liquid crystal display device in accordance with an exemplary embodiment of the present invention. In particular, an upper polarizing plate 420 is positioned over a liquid crystal display panel. In addition, a lower polarizing plate 410 is positioned under the liquid crystal display panel.

Referring to FIG. 6, a liquid crystal display device 3000 includes a lamp unit 110, a light guide panel 120, an array substrate 200, a cover substrate 300, a liquid crystal layer 400, a lower polarizing plate 410 and an upper polarizing plate 420.

In FIG. 6, the same reference numerals denote the same elements in FIG. 1. Thus, any further explanation of the already-described elements will be omitted.

A liquid crystal display panel 500 includes the array substrate 200, the liquid crystal layer 400 and the cover substrate 300.

The lower polarizing plate 410 is positioned beneath the array substrate 200. The lower polarizing plate 410 has a first polarizing axis.

The upper polarizing plate 420 is positioned on the cover substrate 300. The upper polarizing plate 420 has a second polarizing axis.

The first polarizing axis may be substantially perpendicular to the second polarizing axis.

A blue light including a first blue ray and a second blue is incident on the lower polarizing plate 410 through the light guide panel 120. The lower polarizing plate 410 provides the first blue ray with the array substrate 200.

A light path of the first blue ray is described above. Thus, any repetitive explanation will be omitted.

A second red light, a second green light, the second blue light and a second white light emerge from the upper polarizing plate 420.

As illustrated in FIG. 6, the lamp unit 110 has a bar shape. However, many variations are possible for the shapes of the lamp unit 110. As one example, the lamp unit 110 has a U shape. As another example, the lamp unit 110 has an S shape.

Alternatively, the liquid crystal display device 3000 has a point light source such as a fluorescent diode instead of the lamp unit 110.

FIG. 7 is a cross-sectional view illustrating a liquid crystal display device in accordance with an exemplary embodiment of the present invention. In particular, the liquid crystal display device has a fluorescent diode generating blue light that includes a first blue ray and a second blue ray.

Referring to FIG. 7, a liquid crystal display device 4000 includes a point light source 130, an array substrate 200, a cover substrate 300 and a liquid crystal layer 400.

In FIG. 7, the same reference numerals denote the same elements in FIG. 1, and thus any further explanation of the same elements will be omitted.

The point light source 130 includes a plurality of fluorescent diodes. The fluorescent diode generates blue light that includes a first blue ray and a second blue ray.

Although it is not particularly illustrated in the drawings, the liquid crystal display device 4000 includes a reflection plate or a reflection sheet under the point light source 130. The reflection plate or the reflection sheet may reflect a leakage light toward the array substrate 200.

According to the present invention, a liquid crystal display device includes a color change layer instead of a conventional color filter. By avoiding the use of a conventional color filter, the display quality of the liquid crystal display device is improved.

In addition, the color change layer includes a color change fluorescent material instead of a conventional pigment. By substituting the conventional pigment with the color change fluorescent material, the brightness and gradation of the liquid crystal display device is improved. Thus, the liquid crystal display device efficiently displays an image.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A display panel comprising:
   an array substrate having a first pixel area, a second pixel area, a third pixel area and a fourth pixel area;
   a red fluorescent member formed in the first pixel area, the red fluorescent member emitting a red light by using a blue light incident thereon;
   a green fluorescent member formed in the second pixel area, the green fluorescent member emitting a green light by using a blue light incident thereon;
   a yellow fluorescent member formed in the third pixel area, the yellow fluorescent member emitting a white light by using a blue light incident thereon;
   a plurality of thin film transistors formed in the first, second, third and fourth pixel areas; and
   a liquid crystal layer;
   a first polarizing layer formed between the red, green and yellow fluorescent members and the liquid crystal layer; and
   a cover substrate including a second polarizing layer, wherein the second polarizing layer is disposed between the liquid crystal layer and a remainder of the cover substrate;
   wherein a blue light incident on the fourth pixel area passes through the fourth pixel area so that the blue light is irradiated from the fourth pixel area;
   wherein each of the red, green, and yellow fluorescent members covers each of the thin film transistors; and
   wherein a second polarizing axis of the second polarizing layer is substantially perpendicular to a first polarizing axis of the first polarizing layer.

2. The display panel of claim 1, wherein the first, second, third and fourth pixel areas have a stripe shape and are arranged parallel to one other.

3. The display panel of claim 1, wherein the first, second, third and fourth pixel areas have a lattice shape.

4. The display panel of claim 1, wherein the first, second, third and fourth pixel areas have a lozenge shape.

5. The display panel of claim 1, further comprising a transparent pattern formed in the fourth pixel area and having substantially the same height as each of the red, green and yellow fluorescent members.

6. A display device comprising:
   a light source generating a blue light; and
   a display panel including:
      an array substrate having a first pixel area, a second pixel area, a third pixel area and a fourth pixel area;

a red fluorescent member formed in the first pixel area, the red fluorescent member emitting a red light by using a blue light incident thereon;

a green fluorescent member formed in the second pixel area, the green fluorescent member emitting a green light by using a blue light incident thereon;

a yellow fluorescent member formed in the third pixel area, the yellow fluorescent member emitting a white light by using a blue light incident thereon;

a plurality of thin film transistors formed in the first, second, third and fourth pixel area;

a liquid crystal layer;

a first polarizing layer formed between the red, green and yellow fluorescent members and the liquid crystal layer; and a cover substrate including a second polarizing layer, wherein the second polarizing layer is disposed between the liquid crystal layer and the cover substrate, wherein a blue light incident on the fourth pixel area passes through the fourth pixel area so that the blue light is irradiated from the fourth pixel area;

wherein each of the red, green and yellow fluorescent members covers each of the thin film transistors, and wherein a second polarizing axis of the second polarizing layer is substantially perpendicular to a first polarizing axis of the first polarizing layer.

7. The display device of claim 6, wherein the fourth pixel area comprises a transparent pattern having substantially the same height as each of the red, green and yellow fluorescent members.

8. The display device of claim 6, wherein the light source comprises a lamp body and a blue fluorescent material, the blue fluorescent material being contained in the lamp body.

9. The display device of claim 6, wherein the light source is a blue fluorescent diode.

* * * * *